(12) United States Patent
Park et al.

(10) Patent No.: US 9,548,646 B2
(45) Date of Patent: Jan. 17, 2017

(54) LINEAR VIBRATION MOTOR

(71) Applicant: SAMSUNG ELECTRO-MECHANICS CO., LTD., Suwon (KR)

(72) Inventors: Seok Jun Park, Suwon (KR); Yong Jin Kim, Suwon (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 13/831,729

(22) Filed: Mar. 15, 2013

(65) Prior Publication Data

US 2014/0159511 A1 Jun. 12, 2014

(30) Foreign Application Priority Data

Dec. 6, 2012 (KR) .................. 10-2012-0141058

(51) Int. Cl.
*H02K 33/18* (2006.01)
*B06B 1/04* (2006.01)

(52) U.S. Cl.
CPC ............... *H02K 33/18* (2013.01); *B06B 1/045* (2013.01)

(58) Field of Classification Search
USPC .............. 310/12.16, 15, 81, 36, 216.001
See application file for complete search history.

(56) References Cited

U.S. PATENT DOCUMENTS

| | | | | |
|---|---|---|---|---|
| 7,859,144 B1 * | 12/2010 | Sahyoun | ...................... | 310/15 |
| 7,884,509 B2 * | 2/2011 | Mukaide | ................ | H02K 41/03 310/12.19 |
| 2004/0150277 A1 * | 8/2004 | Moriyasu | ........................ | 310/81 |
| 2005/0184601 A1 | 8/2005 | Kweon et al. | | |
| 2005/0285454 A1 * | 12/2005 | Choi et al. | ...................... | 310/14 |
| 2006/0001324 A1 * | 1/2006 | Won et al. | ...................... | 310/81 |
| 2007/0216235 A1 * | 9/2007 | Lee | ................................ | 310/36 |
| 2010/0033030 A1 * | 2/2010 | Amemiya et al. | ......... | 310/12.16 |
| 2010/0259114 A1 * | 10/2010 | Kim et al. | ................. | 310/49.03 |
| 2011/0018364 A1 * | 1/2011 | Kim et al. | ...................... | 310/17 |
| 2011/0018369 A1 * | 1/2011 | So | ................................... | 310/30 |
| 2011/0181130 A1 * | 7/2011 | Yoshida | ............... | H02K 41/031 310/12.29 |

(Continued)

FOREIGN PATENT DOCUMENTS

CN 101213730 A 7/2008
CN 101882853 A 11/2010

(Continued)

OTHER PUBLICATIONS

Office action dated Nov. 25, 2013 from related Korean Patent Application No. 10-2012-0141058 and its English summary provided by the client.

(Continued)

*Primary Examiner* — Naishadh Desai
(74) *Attorney, Agent, or Firm* — LRK Patent Law Firm

(57) ABSTRACT

Disclosed herein is a linear vibration motor including: a stator part having an internal space formed therein and including a main magnet mounted therein; a vibrator part including a coil disposed to face the main magnet and accommodated in the internal space of the stator part; and an elastic member connecting to the stator part and the vibrator part to each other, wherein the vibrator part further includes an auxiliary magnet disposed to face the main magnet.

7 Claims, 3 Drawing Sheets

(56) References Cited

U.S. PATENT DOCUMENTS

2012/0080959 A1* 4/2012 Oh et al. ............... 310/25
2012/0169149 A1* 7/2012 Yoon et al. ............ 310/25

FOREIGN PATENT DOCUMENTS

| KR | 2010-0024367 | 3/2010 |
|----|--------------|--------|
| KR | 10-1156867 B1 | 6/2012 |
| KR | 2012-0097309 | 9/2012 |

OTHER PUBLICATIONS

SIPO Office Action for Chinese Application No. 201310648044.0 which corresponds to the above-referenced U.S. application.

\* cited by examiner

LINEAR VIBRATION MOTOR

CROSS REFERENCE TO RELATED APPLICATION

This application claims the benefit of Korean Patent Application No. 10-2012-0141058, filed on Dec. 6, 2012, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

A vibration function of feeding-back reception, origination, a key input state, and the like, to a user of a cellular phone is a necessary function of the cellular phone. In order to implement the vibration function as described above, a coin type/bar type vibration motor and a linear vibration motor have been mainly used. In the past, the vibration function has been used to only feed-back simple reception. However, in a current touch type smart phone, as the vibration function is used in an application such as a messenger, a game, or the like, a long lifespan and a rapid response time have been demanded. In order to satisfy these demands, a linear vibration motor has been used in most of the current smart phones.

Basically, the linear vibration motor is an actuator desired so that a weight and a spring structure supporting the weight have a specific resonant frequency and is driven by an interaction between permanent magnets by inputting sign power close to the resonant frequency to an electromagnet having a winding coil form. The linear vibration motor should secure an internal space enough to move and accelerate the weight in order to maximize vibration force and be designed to have a slim appearance so as to satisfy a demand for slimness by a customer (a terminal manufacturer).

However, a linear vibration motor according to the prior art including the following Prior Art Document has problems such as noise and deterioration in reliability that are structurally caused and a difficulty in improving electromagnetic force.

PRIOR ART DOCUMENT

Patent Document (Patent Document 1) US2005-0184601 A

SUMMARY OF THE INVENTION

The present invention has been made in an effort to provide a linear vibration motor capable of improving electromagnetic force by including an additional magnet in addition to a magnet generating electromagnetic force together with a coil.

Further, the present invention has been made in an effort to provide a linear vibration motor capable of improving electromagnetic force and a falling time by including an additional magnet in addition to a magnet generating electromagnetic force together with a coil and including a magnetic member mounted on the additional magnet.

According to a preferred embodiment of the present invention, there is provided a linear vibration motor including: a stator part having an internal space formed therein and including a main magnet mounted therein; a vibrator part including a coil disposed to face the main magnet and accommodated in the internal space of the stator part; and an elastic member connecting to the stator part and the vibrator part to each other, wherein the vibrator part further includes an auxiliary magnet disposed to face the main magnet.

The stator part may include a case covering the vibrator part and the elastic member and a bracket coupled to the case so as to close the internal space of the case, and the main magnet may include a first main magnet mounted on one surface of the case so as to face the stator part and a second main magnet mounted on one surface of the bracket so as to face the stator part.

The stator part may further include a plate yoke selectively coupled to one surfaces of the first and second main magnets facing each other.

The first and second main magnets may be disposed so that surfaces thereof facing each other have the same polarity.

The auxiliary magnet may be disposed so that a pole thereof different from that of the main magnet faces the pole of the main magnet.

The coil of the stator part may include a hollow part formed therein and have a ring shape, and the auxiliary magnet may include a hollow part formed therein, have a ring shape, and be coupled to an outer peripheral surface of the coil.

The stator part may further include a weight body including a hollow part formed therein, having a ring shape, and coupled to an outer peripheral surface of the auxiliary magnet.

The stator part may further include a damping member mounted on at least one of one surface of the case facing the vibrator part and one surface of the bracket facing the vibrator part.

The elastic member may have one end coupled to the stator part and the other end coupled to the auxiliary magnet.

The stator part may further include a printed circuit board applying external power to the coil and coupled to the auxiliary magnet so as to be connected to the coil.

According to another preferred embodiment of the present invention, there is provided a linear vibration motor including: a stator part having an internal space formed therein and including a main magnet mounted therein; a vibrator part including a coil disposed to face the main magnet and accommodated in the internal space of the stator part; and an elastic member connecting to the stator part and the vibrator part to each other, wherein the vibrator part further includes an auxiliary magnet disposed to face the main magnet and a magnetic member coupled to the auxiliary magnet.

The magnetic member may be mounted on one surface of the auxiliary magnet facing the stator part.

The stator part may include a case covering the vibrator part and the elastic member and a bracket coupled to the case so as to close the internal space of the case, and the main magnet may include a first main magnet mounted on one surface of the case so as to face the stator part and a second main magnet mounted on one surface of the bracket so as to face the stator part.

The first and second main magnets may be disposed so that surfaces thereof facing each other have the same polarity.

The auxiliary magnet may be disposed so that a pole thereof different from that of the main magnet faces the pole of the main magnet.

The coil of the stator part may include a hollow part formed therein and have a ring shape, and the auxiliary magnet may include a hollow part formed therein, have a ring shape, and be coupled to an outer peripheral surface of the coil.

The stator part may further include a weight body including a hollow part formed therein, having a ring shape, and coupled to an outer peripheral surface of the auxiliary magnet, and the magnetic member may be mounted between the auxiliary magnet and the weight body.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
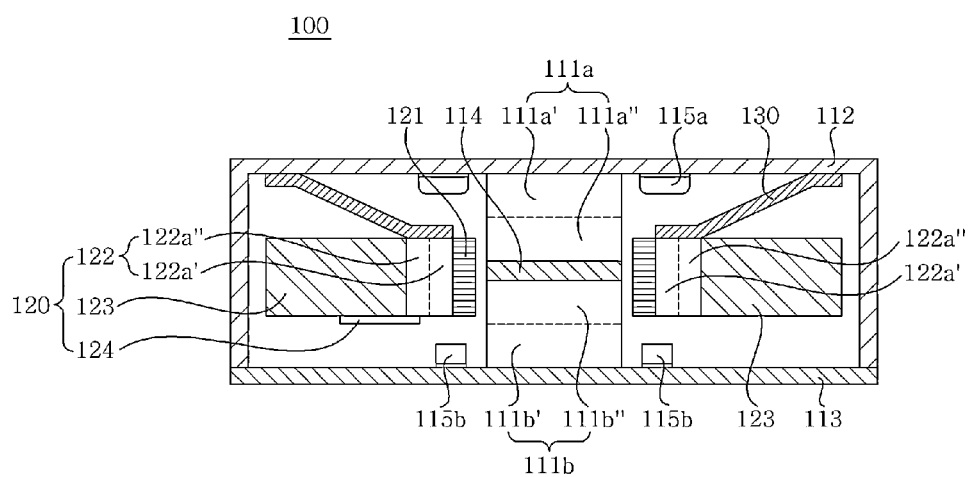
FIG. 1 is a cross-sectional view schematically showing a linear vibration motor according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
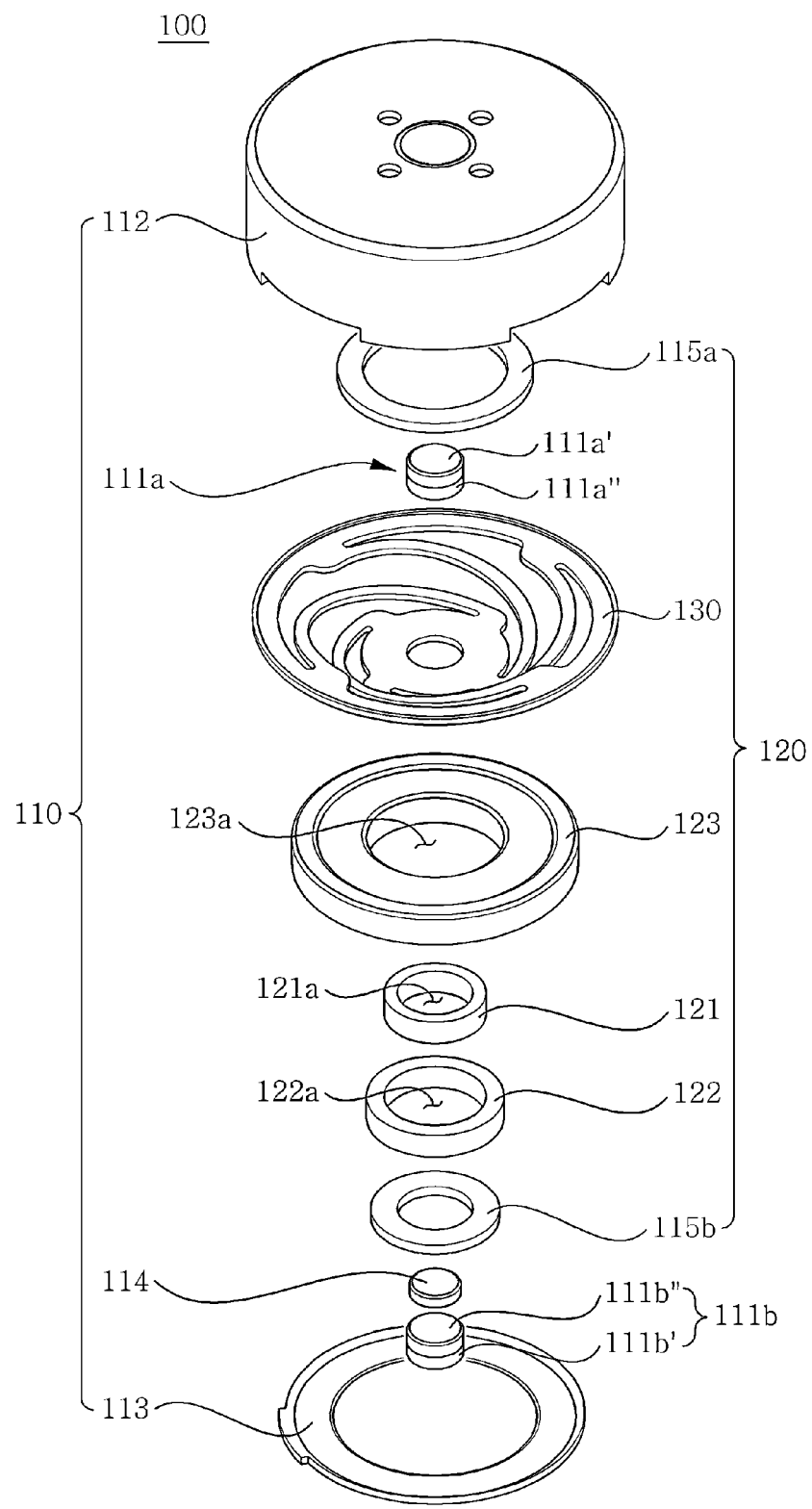
FIG. 2 is an exploded perspective view schematically showing the linear vibration motor shown in FIG. 1.

FIG. 1 is a cross-sectional view schematically showing a linear vibration motor according to a first preferred embodiment of the present invention; and FIG. 2 is an exploded perspective view schematically showing the linear vibration motor shown in FIG. 1.

As shown in FIGS. 1 and 2, the linear vibration motor 100 is configured to include a stator part 110, a vibrator part 120, and an elastic member 130 connecting the stator part 110 and the vibrator part 120 to each other.

In addition, the stator part 110 includes main magnets 111a and 111 b, a case 112, a bracket 113, and a plate yoke 114, and the vibrator part 120 includes a coil 121, an auxiliary magnet 122, a weight body 123, a printed circuit board 124, and damping members 124a and 124b.

More specifically, the case 112 of the stator part 110 includes an internal space formed to cover the vibrator part. In addition, the case 112 is formed in a shape in which a low portion thereof is opened, and the bracket 113 is coupled to a low end portion of the case 112 so as to cover the opened low portion of the case 112.

Further, the main magnets 111a and 111b include a first main magnet 111a mounted on one surface of the case 112 so as to face the vibrator part 120 and a second main magnet 111b mounted on one surface of the bracket 113 so as to face the vibrator part 120.

In addition, the first and second main magnets 111a and 111b may face each other and include the yoke plate 114 selectively coupled to one surfaces thereof facing each other.

In addition, the first and second main magnets 111a and 111b may be configured so that surfaces thereof facing each other have the same polarity in order to increase magnetic efficiency. That is, the first main magnet 111a may include first and second poles 111a' and 111a", which are two different poles, the second main magnet 111b may include first and second poles 111b' and 111b", which are two different poles, and the second pole 111a" of the first main magnet 111a and the second pole 111b" of the second main magnet 111b, which are the same pole as each other, may be disposed to face each other.

That is, in the case in which the first pole is magnetized as an S pole and the second pole is magnetized as an N pole, the first and second main magnets 111a and 111b are disposed so that N poles thereof face each other.

In addition, each of the case 112 and the bracket 113 may be provided with a seating part (not shown) protruded so that the first and second main magnets 111a and 111b are more firmly coupled to the center thereof.

Further, the stator part 110 of the linear vibration motor 100 according to the first preferred embodiment of the present invention may further include damping members 115a and 115b for decreasing collision and friction noise between the stator part 110 and the vibrator part 120.

Further, the damping members 115a and 115b are selectively mounted on one surface of the case 112 and one surface of the bracket 113 that face the vibrator part 120, respectively. FIG. 1 shows that the damping members 151a and 151b are mounted on both of one surface of the case 112 and one surface of the bracket 113 that face the vibrator part 120.

Next, the coil 121 of the vibrator part 120 is disposed to face the main magnets 111a and 111b. More specifically, the coil 121 may include a hollow part 121a formed therein so that it is linearly reciprocated in a state in which the main magnets 111a and 111b are disposed therein and have a ring shape.

In addition, the auxiliary magnet 122 is coupled to an outer peripheral portion of the coil 121 in order to improve electromagnetic force. To this end, the auxiliary magnet 122 may include a hollow part 122a formed therein and have a ring shape. In addition, the auxiliary magnet 122 may be disposed so that one pole and the other pole thereof are magnetized so as to face the main magnets adjacent thereto in order to improve a falling time and be disposed so that a pole thereof different from that of the main magnets faces the pole of the main magnets.

That is, the auxiliary magnet 122 is coupled to the coil so as to face the first and second main magnets 111a and 111b, and the first and second main magnets 111a and 111b are disposed so that the second poles 111a" and 111b" thereof are adjacent to each other so as to face the auxiliary magnet 122. Therefore, the auxiliary magnet 122 is disposed so that the first pole 122a' thereof faces the second poles 111a" and 111b".

In addition, as described above, in the case in which the first pole is magnetized as the S pole and the second pole is magnetized as the N pole, the first and second main magnets 111a and 111b are disposed so that the N poles thereof face each other, and the auxiliary magnet is disposed so that the S pole thereof faces the N poles of the first and second main magnets 111a and 111b.

In addition, the weight body 123 includes a hollow part 123a formed therein, has a ring shape, and is coupled to an outer peripheral surface of the auxiliary magnet 122.

That is, the auxiliary magnet 122 is coupled to the hollow part 123a of the weight body 123, the coil 121 is coupled to the hollow part 122a of the auxiliary magnet 122, such that the weight body 123 may linearly move in a state in which the main magnets 111a and 111b and the plate yoke 114 are disposed in the hollow part 121a of the coil 121.

In addition, the printed circuit board 124, which is to transfer external power to the coil 121, is coupled to the vibrator part 120 so that one end thereof is connected to the coil 121.

Further, in FIG. 1, an example in which the printed circuit board is coupled to the weight body and the auxiliary magnet is shown.

The stator part 110 and the vibrator part 120 are configured as described above, and the elastic member 130 has one end coupled to the stator part 110 and the other end coupled to the vibrator part 120.

In FIG. 1, an example in which one end of the elastic member 130 is coupled to one surface of the case 112 and the other end of the elastic member 130 is coupled to the auxiliary magnet 122 is shown.

The linear vibration motor 100 according to the first preferred embodiment of the present invention configured as described above includes the auxiliary magnet in addition to the main magnet generating electromagnetic force together with the coil to allow the vibrator part to linearly vibrate, such that the electromagnetic force may be improved, and the main magnet and the auxiliary magnet facing the main magnet are disposed to have different polarities, such that the falling time may be improved.

Figure 3:
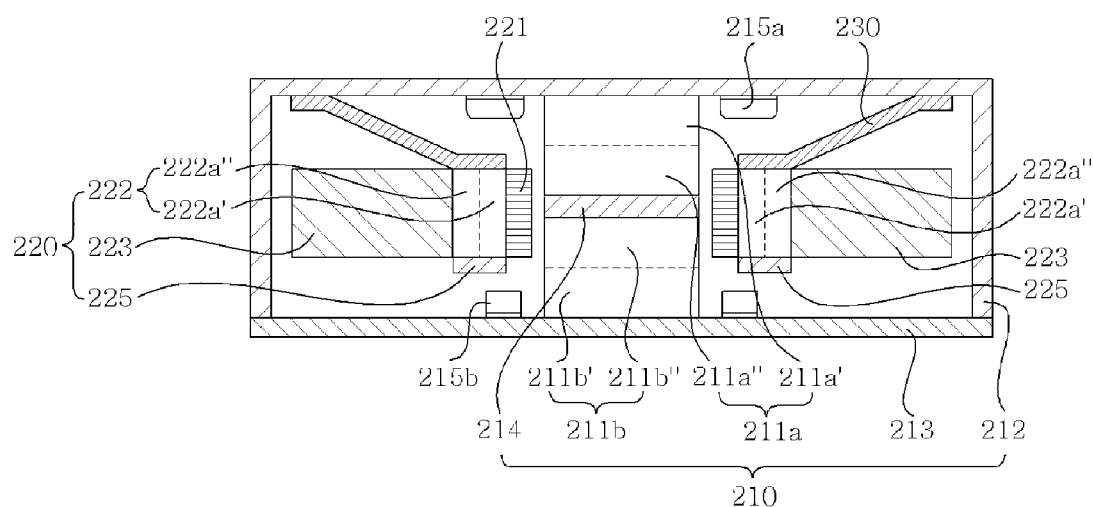
FIG. 3 is a cross-sectional view schematically showing a linear vibration motor according to a second preferred embodiment of the present invention.

FIG. 3 is a cross-sectional view schematically showing a linear vibration motor according to a second preferred embodiment of the present invention. As shown in FIG. 3, the linear vibration motor 200 according to the second preferred embodiment of the present invention is different from the linear vibration motor 100 according to the first preferred embodiment of the present invention shown in FIG. 1 in that it further includes a magnetic member.

More specifically, the linear vibration motor 200 is configured to include a stator part 210, a vibrator part 220, and an elastic member 230 connecting the stator part 210 and the vibrator part 220 to each other.

In addition, the stator part 210 includes main magnets 211a and 211b, a case 212, a bracket 213, and a plate yoke 214, and the vibrator part 220 includes a coil 221, an auxiliary magnet 222, a weight body 223, a magnetic member 225, and damping members 224a and 224b.

Further, the main magnets 211a and 211b include a first main magnet 211a mounted on one surface of the case 212 so as to face the stator part 210 and a second main magnet 211b mounted on one surface of the bracket 213 so as to face the stator part 210.

In addition, the first and second main magnets 211a and 211b may be configured so that surfaces thereof facing each other have the same polarity in order to increase magnetic efficiency. That is, the first main magnet 211a may include first and second poles 211a' and 211a", which are two different poles, the second main magnet 211b may include first and second poles 211b' and 211b", which are two different poles, and the second pole 211a" of the first main magnet 211a and the second pole 211b" of the second main magnet 211b, which are the same pole as each other, may be disposed to face each other.

Further, the stator part 210 of the linear vibration motor 200 according to the second preferred embodiment of the present invention may further include damping members 215a and 215b for decreasing collision and friction noise between the stator part 210 and the vibrator part 220.

In addition, the damping members 215a and 215b are mounted on one surface of the case 212 and one surface of the bracket 213 that face the vibrator part 220.

Further, since more specific shapes of the respective components of the linear vibration motor according to the second preferred embodiment of the present invention and organic coupling therebetween are the same as those of the linear vibration motor according to the first preferred embodiment of the present invention, a detailed description thereof will be omitted.

Meanwhile, the magnetic member 225 is coupled to the auxiliary magnet 222. This is to improve magnetic force between the magnetic member 225 and the main magnets 211a and 211b in addition to the auxiliary magnet 222.

In addition, the case in which the linear vibration motor 200 according to the second preferred embodiment of the present invention includes the magnetic member 225 mounted on one surface of the auxiliary magnet 222 facing the stator part has been shown in FIG. 3.

The linear vibration motor 200 according to the second preferred embodiment of the present invention configured as described above includes the magnetic member in addition to the auxiliary magnet, such that the electromagnetic force is further improved.

Figure 4:
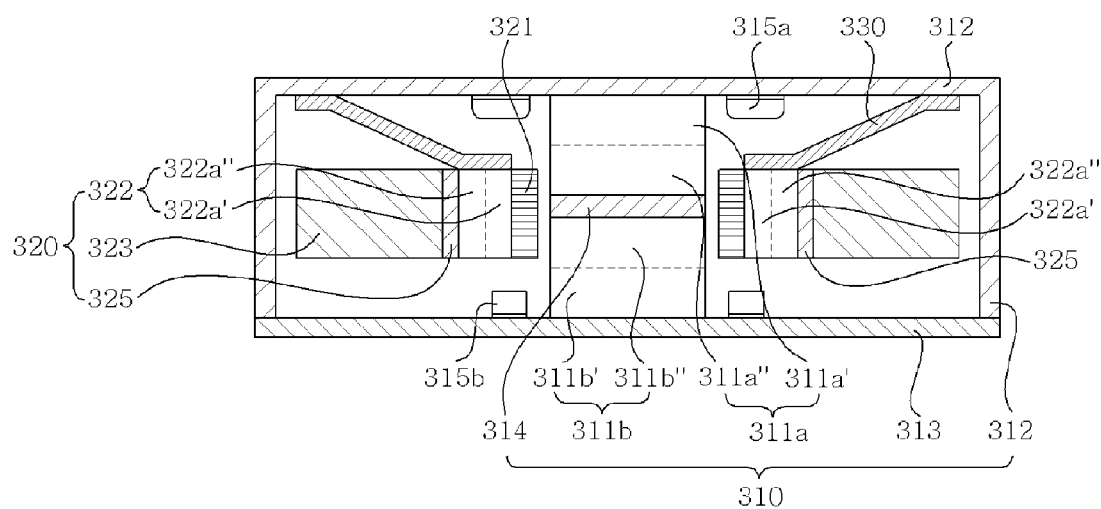
FIG. 4 is a cross-sectional view schematically showing a linear vibration motor according to a third preferred embodiment of the present invention.

FIG. 4 is a cross-sectional view schematically showing a linear vibration motor according to a third preferred embodiment of the present invention. As shown in FIG. 3, the linear vibration motor 300 according to the third preferred embodiment of the present invention is different, only in a position at which a magnetic member is mounted, from the linear vibration motor 200 according to the second preferred embodiment of the present invention shown in FIG. 3.

More specifically, the linear vibration motor 300 is configured to include a stator part 310, a vibrator part 320, and an elastic member 330 connecting the stator part 310 and the vibrator part 320 to each other.

In addition, the stator part 310 includes main magnets 311a and 311b, a case 312, a bracket 313, and a plate yoke 314, and the vibrator part 320 includes a coil 321, an auxiliary magnet 322, a weight body 323, a magnetic member 325, and damping members 324a and 324b.

Further, the main magnets 311a and 311b include a first main magnet 311a mounted on one surface of the case 312 so as to face the stator part 310 and a second main magnet 311b mounted on one surface of the bracket 313 so as to face the stator part 310.

In addition, the first and second main magnets 311a and 311b may be configured so that surfaces thereof facing each other have the same polarity in order to increase magnetic efficiency. That is, the first main magnet 311a may include first and second poles 311a' and 311a", which are two different poles, the second main magnet 311b may include first and second poles 311b' and 311b", which are two different poles, and the second pole 311a" of the first main magnet 311a and the second pole 311b" of the second main magnet 311b, which are the same pole as each other, may be disposed to face each other.

Further, the stator part 310 of the linear vibration motor 300 according to the third preferred embodiment of the present invention may further include damping members 351a and 351b for decreasing collision and friction noise between the stator part 310 and the vibrator part 320.

In addition, the damping members 351a and 351b are mounted on one surface of the case 312 and one surface of the bracket 313 that face the vibrator part 320.

Further, since more specific shapes of the respective components of the linear vibration motor according to the second preferred embodiment of the present invention and organic coupling therebetween are the same as those of the linear vibration motor according to the first preferred embodiment of the present invention, a detailed description thereof will be omitted.

Meanwhile, the magnetic member 325 is coupled to the auxiliary magnet 322 in order to improve magnetic force between the magnetic member 325 and the main magnets 311a and 311b.

In addition, the case in which the linear vibration motor 300 according to the third preferred embodiment of the present invention includes the magnetic member 325 mounted between the auxiliary magnet 322 and the weight body has been shown in FIG. 4.

The linear vibration motor 300 according to the third preferred embodiment of the present invention configured as described above includes the magnetic member in addition to the auxiliary magnet, such that the electromagnetic force is further improved.

According to the preferred embodiments of the present invention, the linear vibration motor capable of improving the electromagnetic force by including the additional magnet in addition to the magnet generating the electromagnetic force together with the coil and capable of improving the electromagnetic force and the falling time by further including the magnetic member mounted on the additional magnet may be obtained.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:
1. A linear vibration motor comprising:
   a stator part including a main magnet, a case, a bracket, and a yoke;
   a vibrator part including a coil, an auxiliary magnet, a weight body, and an elastic member;
   a coil in which a hollow part is formed; and
   an auxiliary magnet coupled to an outer peripheral portion of the coil, wherein
   the main magnet includes a first main magnet and a second main magnet, the first and the second magnets being disposed overlapped, and is mounted in the hollow part of the coil, and the first main magnet is mounted on a surface of the case and the second main magnet is mounted on a surface of the bracket, and wherein
   the first and the second main magnets has an N-pole and a S-pole, respectively, and the first main magnet and the second main magnet is disposed facing to each other having the same pole,
   the auxiliary magnet has an N-pole and a S-pole, and one of the poles formed inside and the other pole formed outside, and the auxiliary magnet is disposed facing to the main magnets, having different polarity from polarity of pole of the main magnet.

2. The linear vibration motor as set for the in claim 1, further comprising a magnetic member coupled to one surface of the auxiliary magnet.

3. The linear vibration motor as set for the in claim 1, wherein the yoke is coupled to one surface of the main magnet.

4. The linear vibration motor as set for the in claim 1, wherein the hollow part has a ring shape, and the linear vibration motor further comprises a weight body coupled to an outer peripheral surface of the auxiliary magnet.

5. The linear vibration motor as set for the in claim 1, wherein the case covers the main magnet, the coil, the auxiliary magnet;
   the bracket is coupled to the case to seal an inner space of the case; and
   the elastic member has one end coupled to the auxiliary magnet and other end coupled to the case or the bracket.

6. The linear vibration motor as set for the in claim 5, further comprising a damping member mounted on at least one of surface of the case and one surface of the bracket.

7. The linear vibration motor as set for the in claim 5, further comprising a printed circuit board which supplies external power to the coil, wherein the printed circuit board is coupled to the auxiliary magnet to be connected to the coil.

* * * * *